US009781630B2

(12) United States Patent
Yi et al.

(10) Patent No.: US 9,781,630 B2
(45) Date of Patent: Oct. 3, 2017

(54) METHOD FOR SEGMENTING AND REORDERING A RADIO LINK CONTROL STATUS PROTOCOL DATA UNIT AND A DEVICE THEREFOR

(71) Applicant: LG ELECTRONICS INC., Seoul (KR)

(72) Inventors: Seungjune Yi, Seoul (KR); Sunyoung Lee, Seoul (KR); Sungjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 14/897,173

(22) PCT Filed: Jul. 9, 2014

(86) PCT No.: PCT/KR2014/006148
§ 371 (c)(1),
(2) Date: Dec. 9, 2015

(87) PCT Pub. No.: WO2015/008966
PCT Pub. Date: Jan. 22, 2015

(65) Prior Publication Data
US 2016/0142939 A1 May 19, 2016

Related U.S. Application Data

(60) Provisional application No. 61/846,623, filed on Jul. 16, 2013.

(51) Int. Cl.
*H04J 3/24* (2006.01)
*H04W 28/06* (2009.01)
*H04W 74/06* (2009.01)

(52) U.S. Cl.
CPC ......... *H04W 28/065* (2013.01); *H04W 74/06* (2013.01)

(58) Field of Classification Search
CPC ... H04W 28/065; H04W 74/06; H04W 80/04; H04W 8/26; H04J 3/076; H04L 29/0653;
(Continued)

(56) References Cited

U.S. PATENT DOCUMENTS 6,788,652 B1 * 9/2004 Hwang ............... H04L 1/16
370/282
7,760,634 B2 * 7/2010 Yi .................. H04B 7/2603
370/231
(Continued)

FOREIGN PATENT DOCUMENTS

WO 2008/094662 8/2008

OTHER PUBLICATIONS

PCT International Application No. PCT/KR2014/006148, Written Opinion of the International Searching Authority dated Oct. 14, 2014, 13 pages.

*Primary Examiner* — Brenda H Pham
(74) *Attorney, Agent, or Firm* — Lee Hong Degerman Kang Waimey

(57) ABSTRACT

The present invention relates to a wireless communication system. More specifically, the present invention relates to a method and a device for segmenting and reordering a RLC status PDUs in the wireless communication system, the method comprising: generating an RLC status PDU (Radio Link Control status Protocol Data Unit); segmenting the generated RLC status PDU if a size of transmitting resource is smaller than a size of the generated RLC status PDU; generating a plurality of Segment RLC status PDUs, wherein each Segment RLC status PDU has a segment of the generated RLC status PDU and a RLC header including
(Continued)

segmentation information; and transmitting the plurality of Segment RLC status PDUs.

8 Claims, 19 Drawing Sheets

(58) Field of Classification Search
CPC ......... H04L 2012/5652; H04L 61/2092; H04L 1/0028; H04L 1/0079; H04L 1/0083; H04L 1/0084; H04L 1/0085
USPC .................................. 370/349, 389, 394, 474
See application file for complete search history.

(56) References Cited

U.S. PATENT DOCUMENTS

| | | | | |
|---|---|---|---|---|
| 8,473,825 B2 * | 6/2013 | Burbidge | ............. | H04L 1/1621 714/752 |
| 2003/0093739 A1 * | 5/2003 | Han | .............. | H03M 13/00 714/746 |
| 2003/0191844 A1 * | 10/2003 | Meyer | ............. | H04L 1/1809 709/227 |
| 2004/0008659 A1 | 1/2004 | Kim | | |
| 2005/0138528 A1 * | 6/2005 | Ameigeiras | ............ | H04L 1/1874 714/774 |
| 2006/0251105 A1 * | 11/2006 | Kim | ............. | H04L 1/1685 370/449 |
| 2007/0081513 A1 * | 4/2007 | Torsner | ............. | H04W 72/1242 370/349 |
| 2008/0225893 A1 * | 9/2008 | Cave | ............. | H04L 1/1874 370/476 |
| 2009/0044067 A1 * | 2/2009 | Obuchi | .............. | H04L 1/1621 714/748 |
| 2009/0086656 A1 * | 4/2009 | Kuchibhotla | ............ | H04L 47/10 370/310 |
| 2009/0175206 A1 * | 7/2009 | Wang | ............. | H04L 1/1621 370/310 |
| 2009/0215456 A1 * | 8/2009 | Chun | ............. | H04W 72/10 455/435.1 |
| 2009/0232069 A1 * | 9/2009 | Sun | ............. | H04L 1/1628 370/329 |
| 2009/0257377 A1 * | 10/2009 | Vedantham | ............ | H04L 1/1835 370/328 |
| 2010/0105334 A1 * | 4/2010 | Terry | ............. | H04L 1/1607 455/67.11 |
| 2010/0323720 A1 | 12/2010 | Jen | | |
| 2011/0051664 A1 | 3/2011 | Kim et al. | | |

* cited by examiner (a) Control-Plane Protocol Stack (b) User-Plane Protocol Stack Component carrier 5 component carriers → 100 MHz C-Plane connectivity of eNBs involved in dual connectivity U-Plane connectivity of eNBs involved in dual connectivity

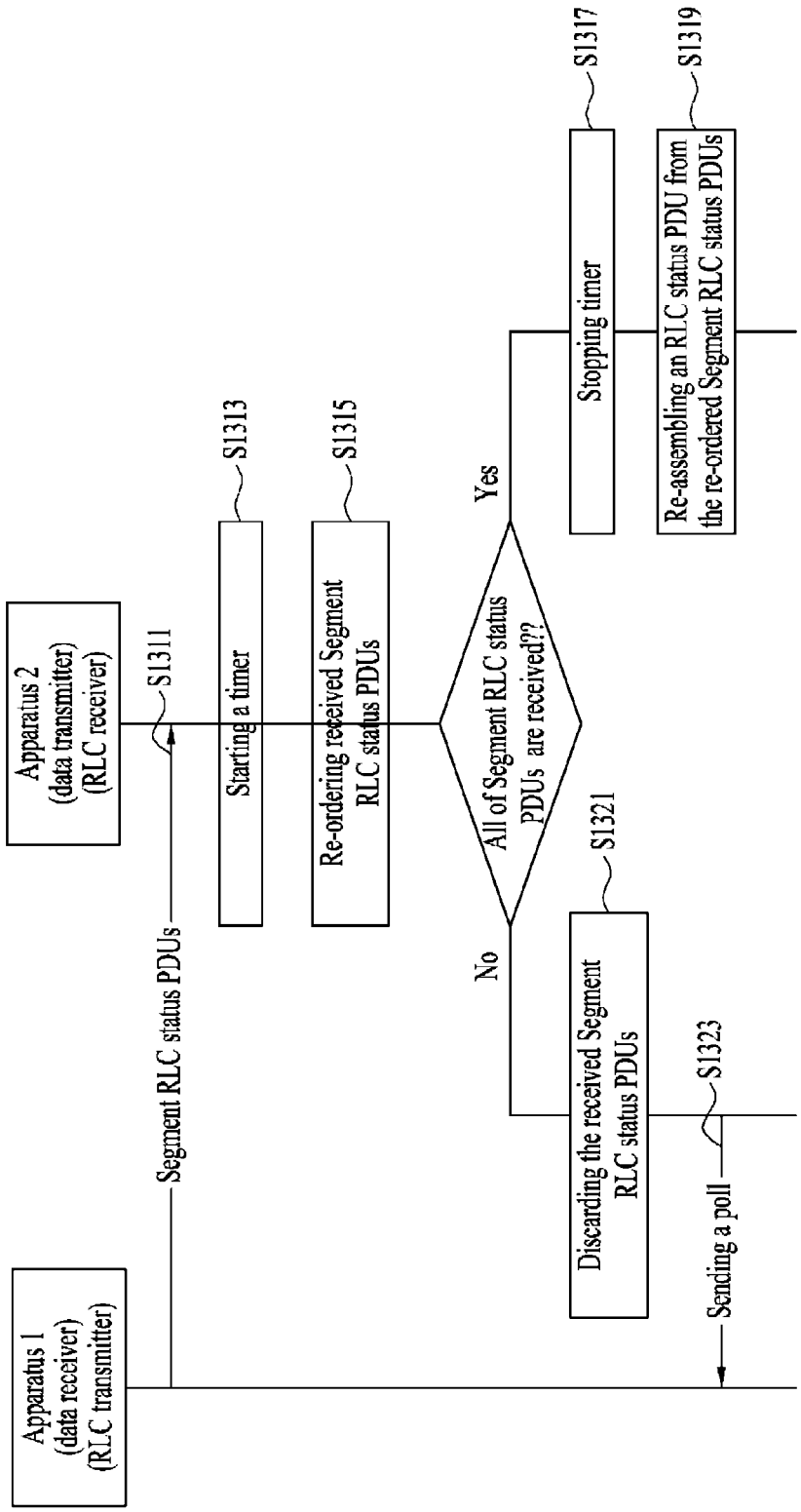

METHOD FOR SEGMENTING AND REORDERING A RADIO LINK CONTROL STATUS PROTOCOL DATA UNIT AND A DEVICE THEREFOR

CROSS-REFERENCE TO RELATED APPLICATIONS

This application is the National Stage filing under 35 U.S.C. 371 of International Application No. PCT/KR2014/006148, filed on Jul. 9, 2014, which claims the benefit of U.S. Provisional Application No. 61/846,623, filed on Jul. 16, 2013, the contents of which are all hereby incorporated by reference herein in their entirety.

TECHNICAL FIELD

The present invention relates to a wireless communication system and, more particularly, to a method for segmenting and reordering an RLC status PDU (radio link control status protocol data unit) and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for segmenting and reordering an RLC status PDU. The technical problems solved by the present invention are not limited to the above technical problems and those skilled in the art may understand other technical problems from the following description.

Technical Solution

The object of the present invention can be achieved by providing a method for operating by an apparatus in wireless communication system, the method comprising; generating a Radio Link Control (RLC) status PDU (Protocol Data Unit), segmenting the generated RLC status PDU if a size of transmitting resource is smaller than a size of the generated RLC status PDU, generating a plurality of Segment RLC status PDUs, wherein each Segment RLC status PDU has a segment of the generated RLC status PDU and a RLC header including segmentation information, and transmitting the plurality of Segment RLC status PDUs.

In another aspect of the present invention can be achieved by providing a method for operating by an apparatus in wireless communication system, the method comprising; receiving a plurality of Segment Radio Link Control (RLC) status PDUs (Protocol Data Units), wherein each Segment RLC status PDU includes a segment of a RLC status PDU and a RLC header including segmentation information; re-ordering the plurality of Segment RLC status PDUs based on the segmentation information; and re-assembling an RLC status PDU from the re-ordered Segment RLC status PDUs.

In another aspect of the present invention provided herein is an apparatus in the wireless communication system, the apparatus comprising: an RF (radio frequency) module; and a processor configured to control the RF module, wherein the processor is configured to generate a Radio Link Control (RLC) status PDU (Protocol Data Unit), to segment the generated RLC status PDU if a size of transmitting resource is smaller than a size of the generated RLC status PDU, to generate a plurality of Segment RLC status PDUs, wherein each Segment RLC status PDU has a segment of the generated RLC status PDU and a RLC header including segmentation information, and to transmit the plurality of Segment RLC status PDUs.

In another aspect of the present invention provided herein is an apparatus in the wireless communication system, the apparatus comprising: an RF (radio frequency) module; and a processor configured to control the RF module, wherein the processor is configured to receive a plurality of Segment Radio Link Control (RLC) status PDUs (Protocol Data Units), wherein each Segment RLC status PDU includes a segment of a RLC status PDU and a RLC header including segmentation information; re-order the plurality of Segment RLC status PDUs based on the segmentation information; and to re-assemble an RLC status PDU from the re-ordered Segment RLC status PDUs.

Preferably, the segmentation information indicates a position order of the Segment RLC status PDU in the RLC status PDU.

Preferably, the segmentation information includes at least one of a CPT (Control PDU Type) field indicating whether a RLC status PDU is a Segment RLC status PDU or not, a SN (Sequence Number) field indicating a sequence number of a corresponding Segment RLC status PDU, a FSI (First Segment Indicator) field indicating whether a first byte of the RLC status PDU corresponds to a first byte of the Segment RLC status PDU or an LSI (Last Segment Indicator) field indicating whether a last byte of the RLC status PDU corresponds to a last byte of the Segment RLC status PDU.

Preferably, the segmenting comprises segmenting a portion of the generated RLC status PDU if a size of transmitting resource is smaller than a size of the generated RLC status PDU.

Preferably, the method further comprises: starting a timer when one of the plurality of Segment RLC status PDUs is received and there is no running timer.

Preferably, the method further comprises: stopping the timer when all the plurality of Segment RLC status PDUs are received.

Preferably, the method further comprises: discarding the received Segment RLC status PDUs if one or more Segment RLC status PDUs are not received until the timer expires; and sending a poll to request transmission of an RLC status PDU.

Preferably, said stopping comprises stopping the timer if a FSI field of a Segment RLC status PDU with a lowest sequence number indicates '0' and a LSI field of a Segment RLC status PDU with a highest sequence number indicates '0'.

It is to be understood that both the foregoing general description and the following detailed description of the present invention are exemplary and explanatory and are intended to provide further explanation of the invention as claimed.

Advantageous Effects

According to the present invention, segmentation and reordering an RLC status PDU can be efficiently performed in a wireless communication system. Specifically, the invention can provide a solution about segmentation and reordering a RLC status PDU in a dual connectivity system.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIGS. 13A and 13B are conceptual diagrams for segmenting and re-ordering an RLC status PDU according to embodiments of the present invention;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
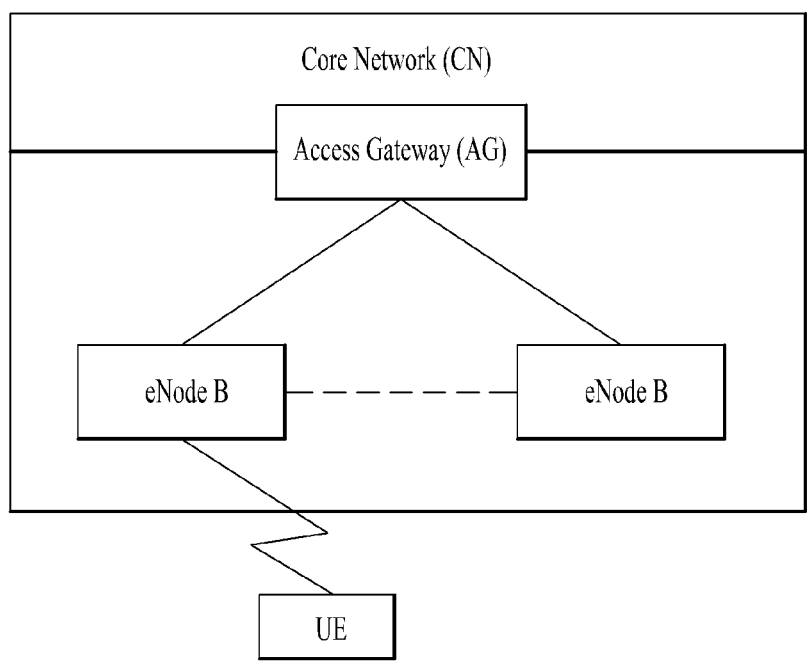
FIG. 1 is a diagram showing a network structure of an Evolved Universal Mobile Telecommunications System (E-UMTS) as an example of a wireless communication system.
Figure 2A:
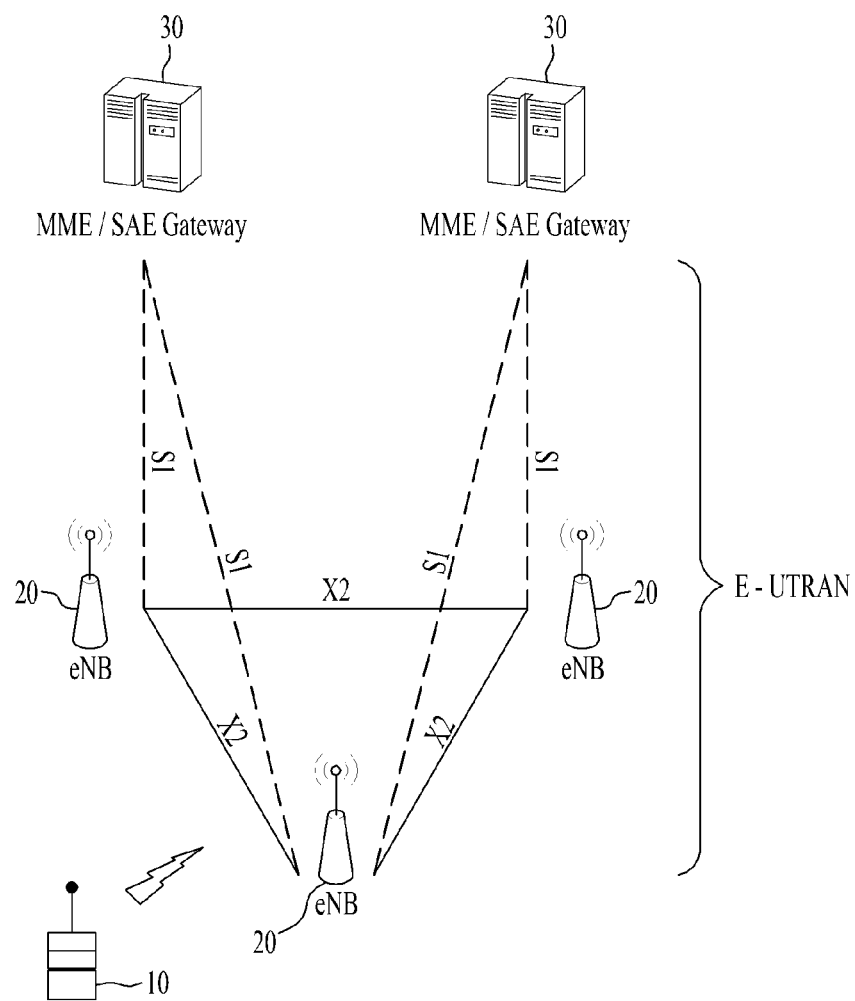
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
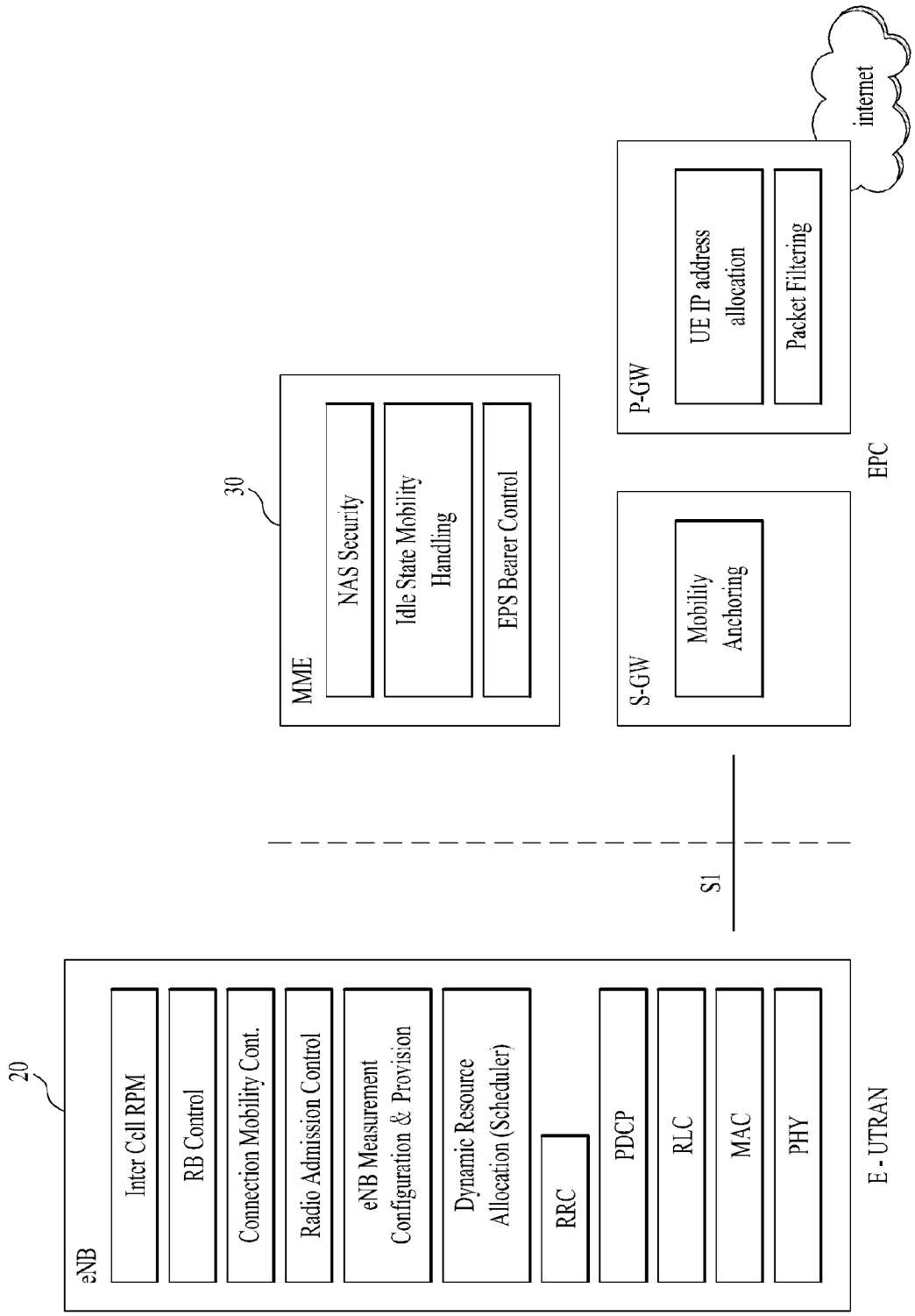
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
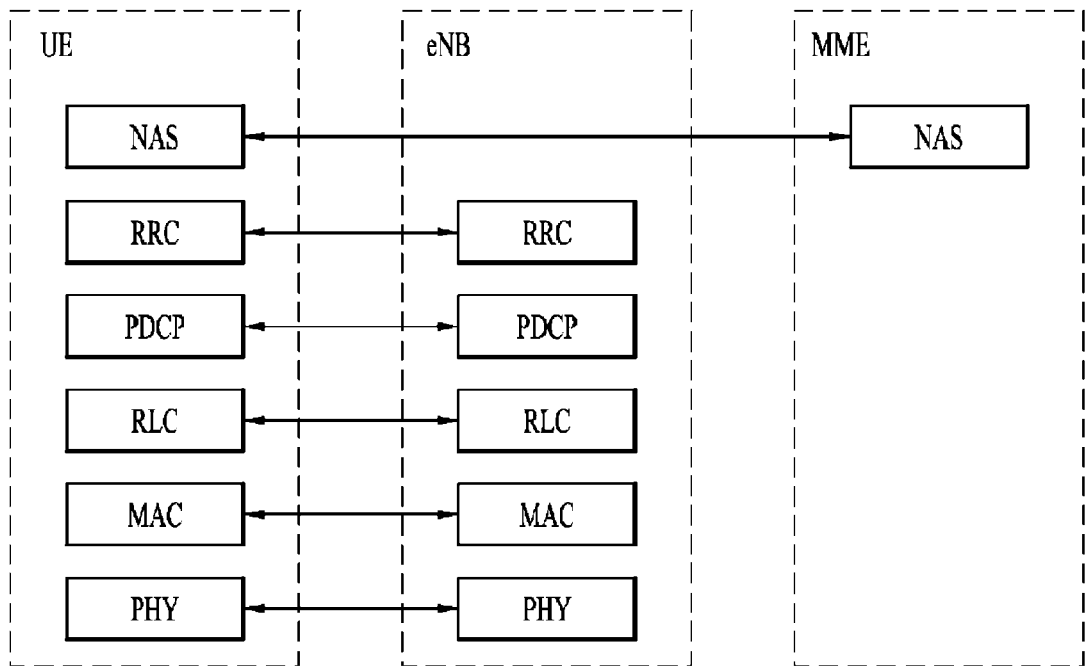
FIG. 3 is a diagram showing a control plane and a user plane of a radio interface protocol between a UE and an E-UTRAN based on a 3rd generation partnership project (3GPP) radio access network standard.
Figure 3:
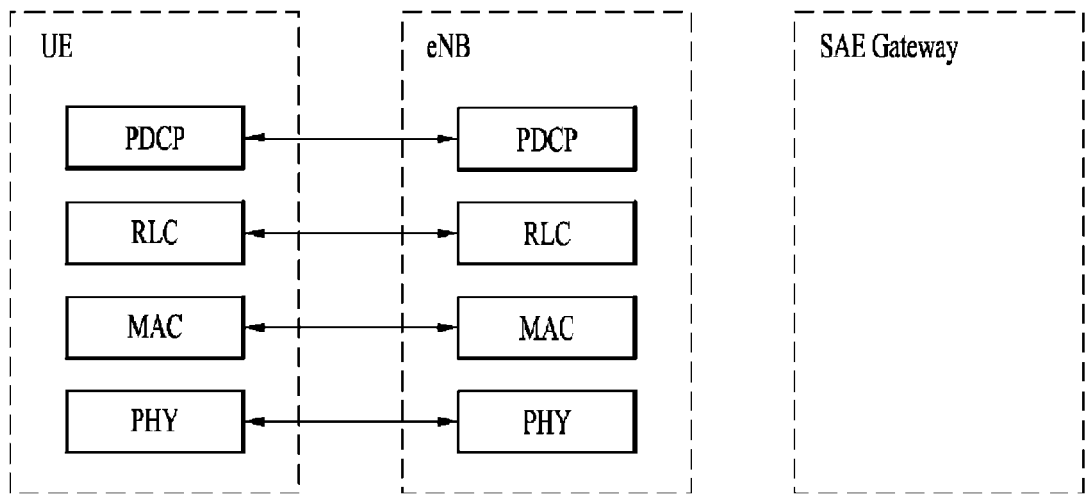

FIG. 3 is a diagram showing a control plane (a) and a user plane (b) of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
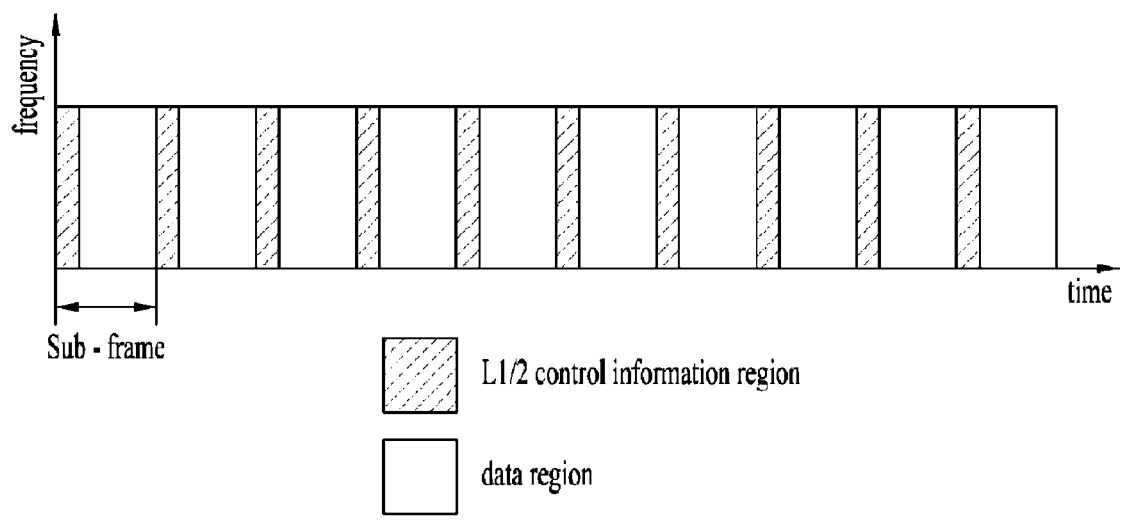
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
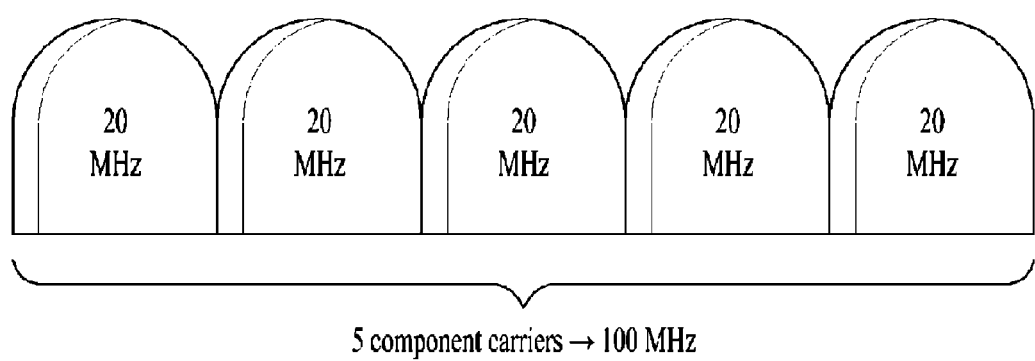
FIG. 5 is a diagram for carrier aggregation.

FIG. 5 is a diagram for carrier aggregation.

Carrier aggregation technology for supporting multiple carriers is described with reference to FIG. 5 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 6:
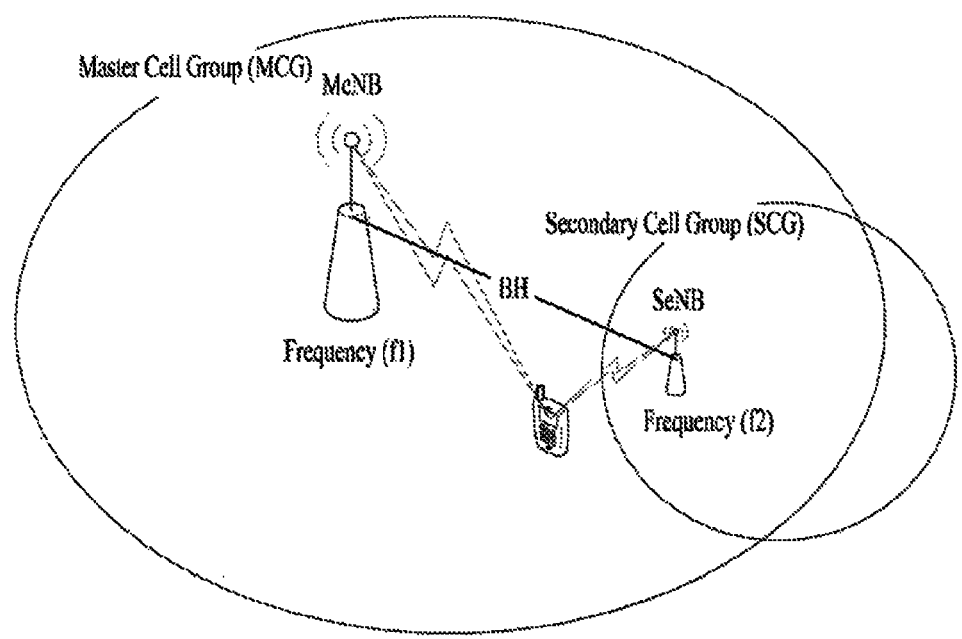
FIG. 6 is a conceptual diagram for dual connectivity between a Master Cell Group (MCG) and a Secondary Cell Group (SCG)

FIG. 6 is a conceptual diagram for dual connectivity (DC) between a Master Cell Group (MCG) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 7A:
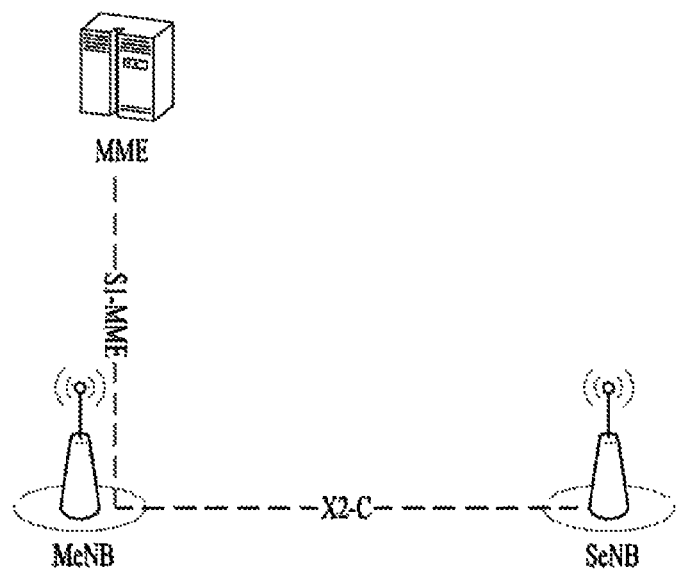
FIG. 7A is a conceptual diagram for C-Plane connectivity of base stations involved in dual connectivity.

FIG. 7A shows C-plane (Control Plane) connectivity of eNBs involved in dual connectivity for a certain UE: The MeNB is C-plane connected to the MME via S1-MME, the MeNB and the SeNB are interconnected via X2-C(X2-Control plane). As FIG. 7A, Inter-eNB control plane signaling for dual connectivity is performed by means of X2 interface signaling. Control plane signaling towards the MME is performed by means of 51 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

Figure 7B:
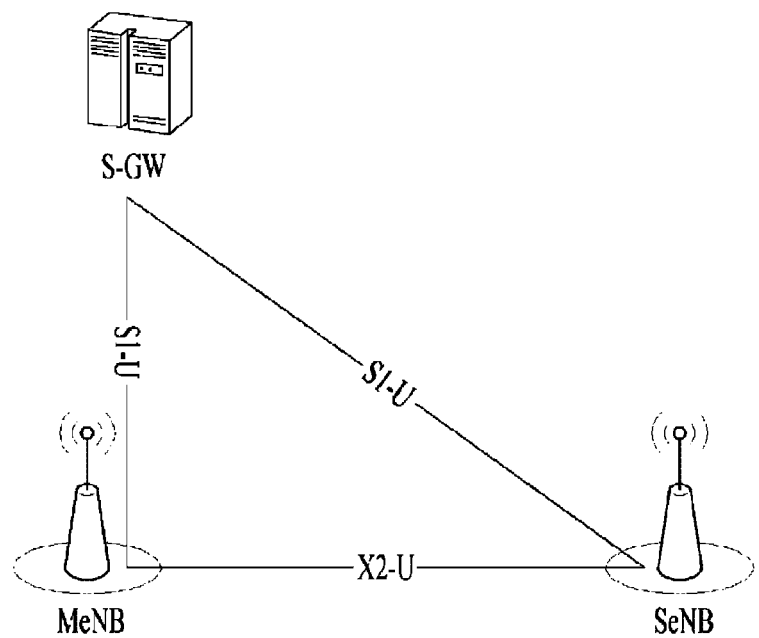
FIG. 7B is a conceptual diagram for U-Plane connectivity of base stations involved in dual connectivity.

FIG. 7B shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 8:
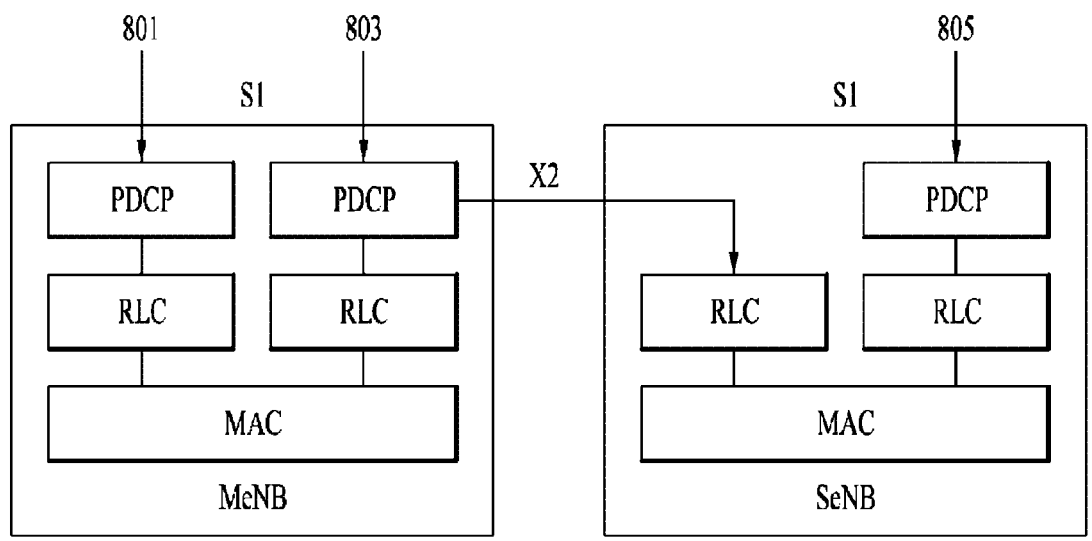
FIG. 8 is a conceptual diagram for radio protocol architecture for dual connectivity.

FIG. 8 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (801), split bearer (803) and SCG bearer (805). Those three alternatives are depicted on FIG. 7. The SRBs (Signaling Radio Bearers) are always of the MCG bearer and therefore only use the radio resources provided by the MeNB. The MCG bearer (801) is a radio protocol only located in the MeNB to use MeNB resources only in the dual connectivity. And the SCG bearer (805) is a radio protocol only located in the SeNB to use SeNB resources in the dual connectivity.

Specially, the split bearer (803) is a radio protocol located in both the MeNB and the SeNB to use both MeNB and SeNB resources in the dual connectivity and the split bearer (803) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

Figure 9:
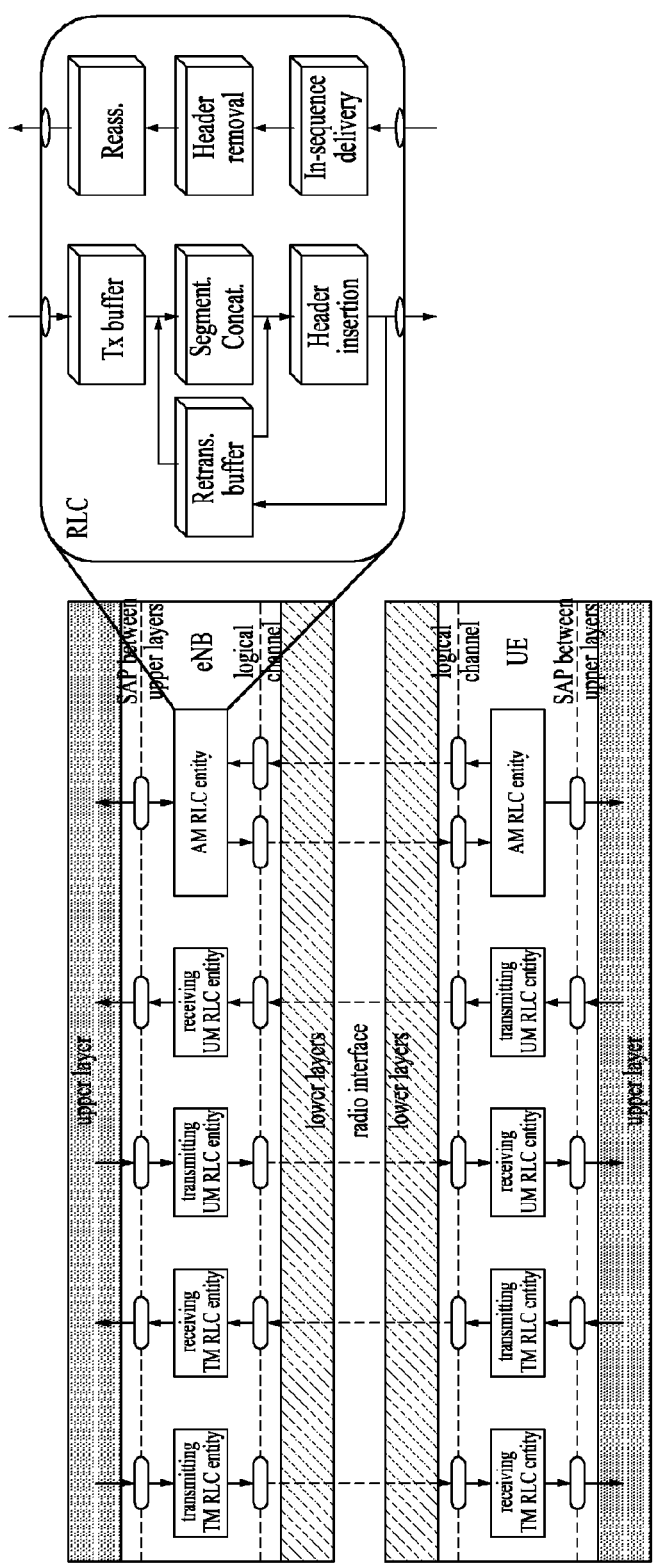
FIG. 9 is a conceptual diagram for an RLC (Radio Link Control) entity architecture.

FIG. 9 is a conceptual diagram for an RLC (Radio Link Control) entity architecture.

The radio-link control (RLC) protocol takes data in the form of RLC SDUs from PDCP and delivers them to the corresponding RLC entity in the receiver by using functionality in MAC and physical layers. The relation between RLC and MAC, including multiplexing of multiple logical channels into a single transport channel, is illustrated in FIG. 9. Multiplexing of several logical channels into a single transport channel is mainly used for priority handling in conjunction with downlink and uplink scheduling.

There is one RLC entity per logical channel configured for a terminal, where each RLC entity is responsible for: i)

segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

Segmentation, Concatenation, and Reassembly of RLC SDUs (Service Data Units)

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

RLC Retransmission

Retransmission of missing PDUs is one of the main functionalities of the RLC. Although most of the errors can be handled by the hybrid-ARQ protocol, there are benefits of having a second-level retransmission mechanism as a complement. By inspecting the sequence numbers of the received PDUs, missing PDUs can be detected and a retransmission requested from the transmitting side.

Different services have different requirements; for some services (for example, transfer of a large file), error-free delivery of data is important, whereas for other applications (for example, streaming services), a small amount of missing packets is not a problem. The RLC can therefore operate in three different modes, depending on the requirements from the application:

Transparent mode (TM), where the RLC is completely transparent and is essentially bypassed. No retransmissions, no segmentation/reassembly, and no in-sequence delivery take place. This configuration is used for control-plane broadcast channels such as BCCH (Broadcast Control Channel), CCCH (Common Control Channel), and PCCH (Paging Control Channel), where the information should reach multiple users. The size of these messages are selected such that all intended terminals are reached with a high probability and hence there is neither need for segmentation to handle varying channel conditions, nor retransmissions to provide error-free data transmission. Furthermore, retransmissions are not possible for these channels as there is no possibility for the terminal to feedback status reports as no uplink has been established.

Unacknowledged mode (UM) supports segmentation/reassembly and in-sequence delivery, but not retransmissions. This mode is used when error-free delivery is not required, for example voiceover IP, or when retransmissions cannot be requested, for example broadcast transmissions on MTCH (Multicast Traffic Channel) and MCCH (Multicast Control Channel) using MBSFN (Multicast/Broadcast over a Single Frequency Network).

Acknowledged mode (AM) is the main mode of operation for TCP/IP packet data transmission on the DL-SCH (Downlink-Shared Channel). Segmentation/reassembly, in-sequence delivery, and retransmissions of erroneous data are all supported.

Figure 10:
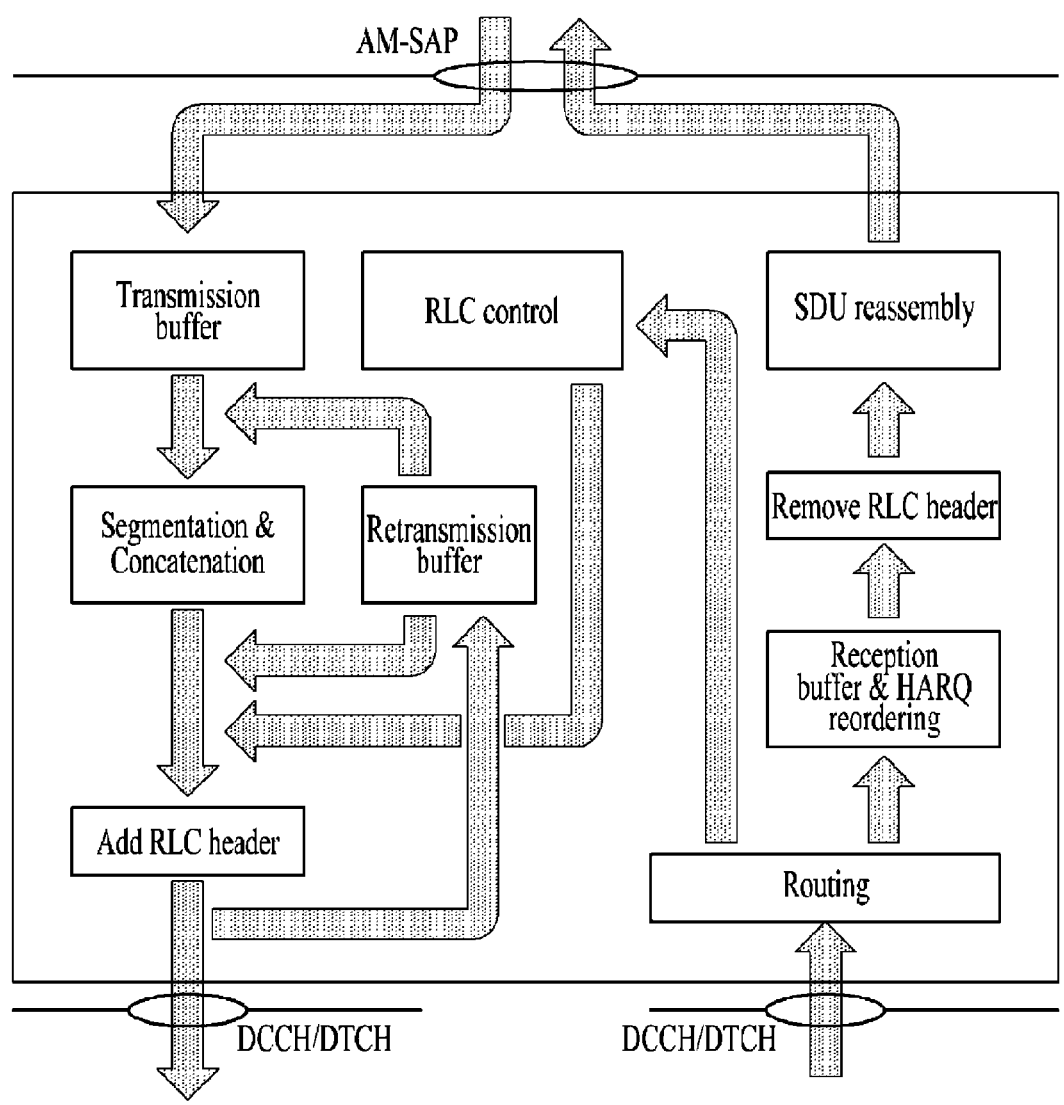
FIG. 10 is a conceptual diagram for an AM RLC (Acknowledged mode Radio Link Control) entity architecture.

FIG. 10 is a conceptual diagram for an AM RLC (Acknowledged mode Radio Link Control) entity architecture.

In acknowledged mode (AM), the RLC entity is bidirectional—that is, data may flow in both directions between the two peer entities. This is obviously needed as the reception of PDUs needs to be acknowledged back to the entity that transmitted those PDUs. Information about missing PDUs is provided by the receiving end to the transmitting end in the form of so-called status reports. Status reports can either be transmitted autonomously by the receiver or requested by the transmitter. To keep track of the PDUs in transit, the transmitter attaches an RLC header to each PDU, including, among other fields, a sequence number.

Both RLC entities maintain two windows, the transmission and reception windows respectively. Only PDUs in the transmission window are eligible for transmission; PDUs with sequence number below the start of the window have already been acknowledged by the receiving RLC. Similarly, the receiver only accepts PDUs with sequence numbers within the reception window. The receiver also discards any duplicate PDUs as each PDU should be assembled into an SDU only once.

Status reports can, as mentioned earlier, be triggered for multiple reasons. However, to control the amount of status reports and to avoid flooding the return link with an excessive number of status reports, it is possible to use a status prohibit timer. With such a timer, status reports cannot be transmitted more often than once per time interval as determined by the timer.

For the initial transmission, it is relatively straightforward to rely on a dynamic PDU size as a means to handle the varying data rates. However, the channel conditions and the amount of resources may also change between RLC retransmissions. To handle these variations, already transmitted PDUs can be (re)segmented for retransmissions. The reordering and retransmission mechanisms described above still apply; a PDU is assumed to be received when all the segments have been received. Status reports and retransmissions operate on individual segments; only the missing segment of a PDU needs to be retransmitted.

Figure 11:
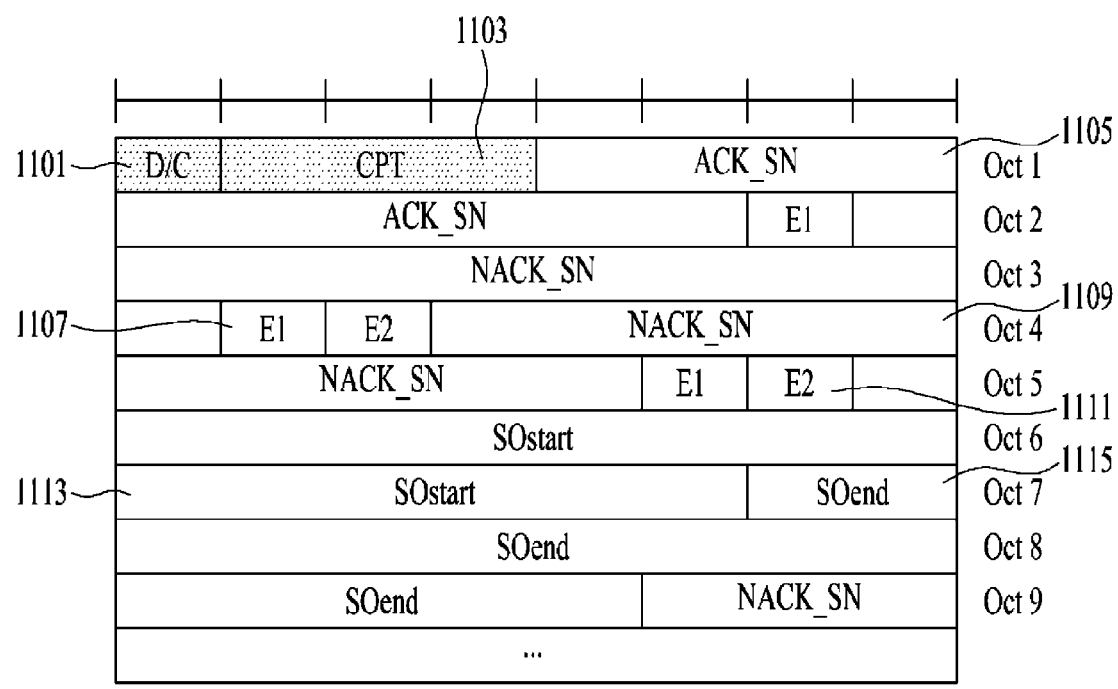
FIG. 11 is a conceptual diagram for an RLC (Radio Link Control) status PDU (Protocol Data Unit) structure.

FIG. 11 is a conceptual diagram for an RLC status PDU structure.

An RLC status PDU is used by the receiving side of an AM RLC entity to inform the peer AM RLC entity about RLC data PDUs that are received successfully, and RLC data PDUs that are detected to be lost by the receiving side of an AM RLC entity.

The RLC status PDU consists of a STATUS PDU payload and a RLC control PDU header. RLC control PDU header consists of a D/C and a CPT field. The STATUS PDU payload starts from the first bit following the RLC control PDU header, and it consists of one ACK_SN and one E1, zero or more sets of a NACK_SN, an E1 and an E2, and possibly a set of a SOstart and a SOend for each NACK_SN. When necessary one to seven padding bits are included in the end of the STATUS PDU to achieve octet alignment.

There are various fields in the RLC status PDU structure.

Data/Control (DC) field (1101): The D/C field indicates whether the RLC PDU is a RLC data PDU or RLC control PDU. The interpretation of the D/C field is provided in Table 1.

TABLE 1

D/C field interpretation

| Value | Description |
| --- | --- |
| 0 | Control PDU |
| 1 | Data PDU |

Control PDU Type (CPT) field (1103): The CPT field indicates the type of the RLC control PDU. The interpretation of the CPT field is provided in Table 2.

TABLE 2

CPT field interpretation

| Value | Description |
| --- | --- |
| 000 | STATUS PDU |
| 001-111 | Reserved (PDUs with this coding will be discarded by the receiving entity for this release of the protocol) |

Acknowledgement SN (ACK_SN) field (1105): The ACK_SN field indicates the SN of the next not received RLC Data PDU which is not reported as missing in the STATUS PDU. When the transmitting side of an AM RLC entity receives a STATUS PDU, it interprets that all AMD PDUs up to but not including the AMD PDU with SN=ACK_SN have been received by its peer AM RLC entity, excluding those AMD PDUs indicated in the STATUS PDU with NACK_SN and portions of AMD PDUs indicated in the STATUS PDU with NACK_SN, SOstart and SOend.

Extension Bit 1 (E1) field (1107): The E1 field indicates whether or not a set of NACK_SN, E1 and E2 follows. The interpretation of the E1 field is provided in Table 3.

TABLE 3

E1 field interpretation

| Value | Description |
| --- | --- |
| 0 | A set of NACK_SN, E1 and E2 does not follow. |
| 1 | A set of NACK_SN, E1 and E2 follows. |

Negative Acknowledgement SN (NACK_SN) field (1109): The NACK_SN field indicates the SN of the AMD PDU (or portions of it) that has been detected as lost at the receiving side of the AM RLC entity.

Extension Bit 2 (E2) field (1111): The E2 field indicates whether or not a set of SOstart and SOend follows. The interpretation of the E2 field is provided in Table 4.

TABLE 4

E2 field interpretation

| Value | Description |
| --- | --- |
| 0 | A set of SOstart and SOend does not follow for this NACK_SN. |
| 1 | A set of SOstart and SOend follows for this NACK_SN. |

SO Start (SOstart) field (1113): The SOstart field (together with the SOend field) indicates the portion of the AMD PDU with SN=NACK_SN (the NACK_SN for which the SOstart is related to) that has been detected as lost at the receiving side of the AM RLC entity. Specifically, the SOstart field indicates the position of the first byte of the portion of the AMD PDU in bytes within the Data field of the AMD PDU. The first byte in the Data field of the original AMD PDU is referred by the SOstart field value "0000000000000000", i.e., numbering starts at zero.

SO End (SOend) field (1115): The SOend field (together with the SOstart field) indicates the portion of the AMD PDU with SN=NACK_SN (the NACK_SN for which the SOend is related to) that has been detected as lost at the receiving side of the AM RLC entity. Specifically, the SOend field indicates the position of the last byte of the portion of the AMD PDU in bytes within the Data field of the AMD PDU. The first byte in the Data field of the original AMD PDU is referred by the SOend field value "0000000000000000", i.e., numbering starts at zero. The special SOend value "1111111111111111" is used to indicate that the missing portion of the AMD PDU includes all bytes to the last byte of the AMD PDU.

Reserved 1 (R1) field (NOT described)_: The R1 field is a reserved field for this release of the protocol. The transmitting entity shall set the R1 field to "0". The receiving entity shall ignore this field.

Figure 12:
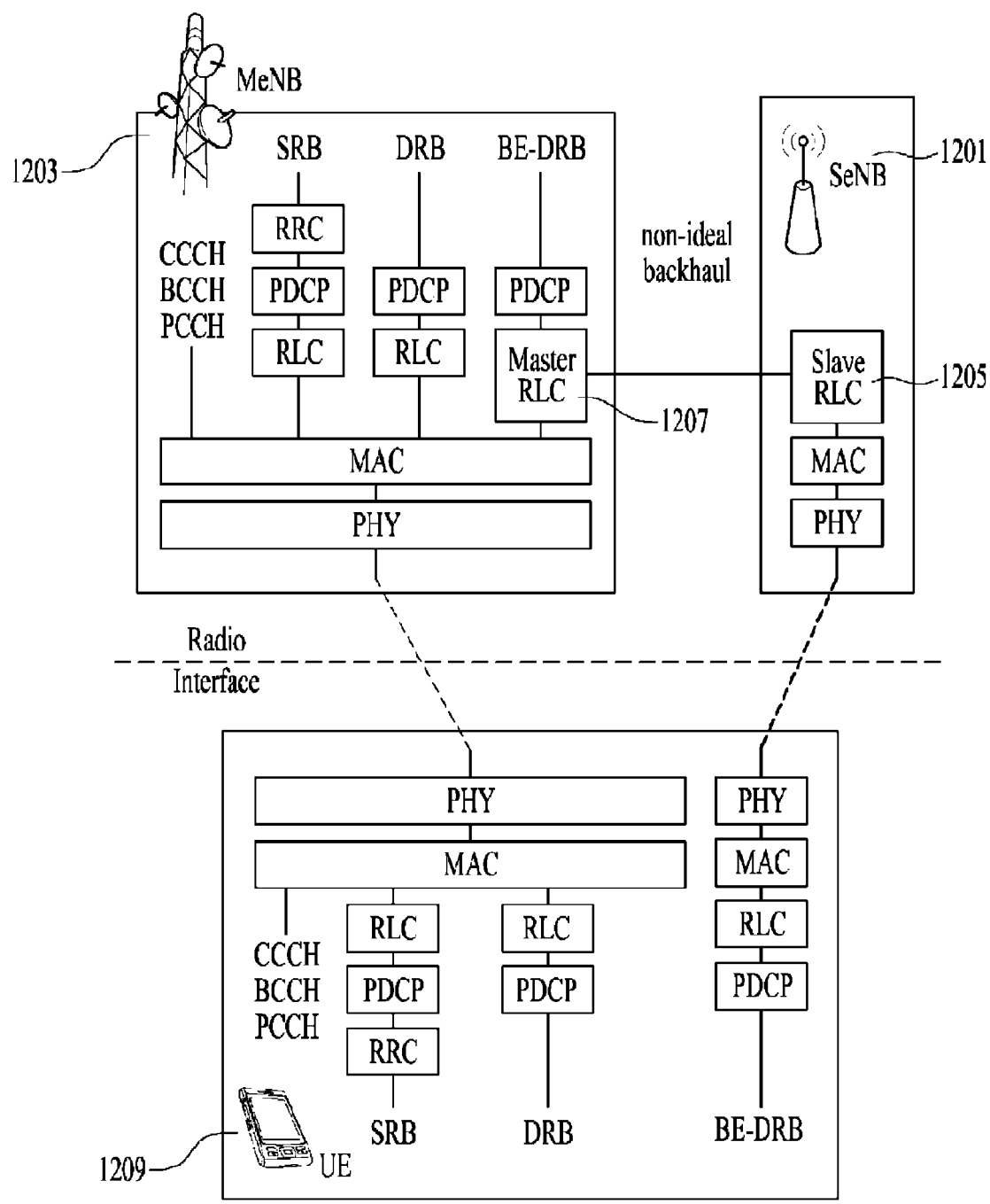
FIG. 12 is a conceptual diagram for one of radio protocol architecture for dual connectivity.

FIG. 12 is a conceptual diagram for one of radio protocol architecture for dual connectivity.

The SeNB (1201) is responsible for transmitting best effort (BE) type traffic, while the MeNB (1203) is responsible for transmitting other types of traffic such as VoIP, streaming data, or signaling data. To support dual connectivity, various protocol architectures are studied, and one of potential architectures is shown in FIG. 12. This scheme is called Master/Slave RLC where the conventional RLC functionality is distributed between the nodes involved, with a Slave RLC operating in the SeNB.

In downlink, the Slave RLC entity (1205) takes care of the delay-critical RLC operation needed at the SeNB (1201): it receives from the Master RLC entity (1207) at the MeNB (1203) already built RLC PDUs (with Sequence Number already assigned by the Master RLC) that the Master RLC entity (1207) has assigned for transmission by the Slave RLC entity (1205), and transmits them to the UE (1209). The custom-fitting of these PDUs into the grants from the MAC scheduler is achieved by re-using the currently defined re-segmentation mechanism, i.e. when needed, a PDU received from the Master RLC entity (1207) is transmitted over more than one AMD PDU Segments (for AM bearers), or if applied to UM bearers, their newly adopted "UMD PDU Segment" counterparts.

In uplink, the Slave RLC entity (1205) simply forwards everything that it receives from the UE (1209) to the Master RLC entity (1207) in the MeNB (1203), i.e. the Master RLC entity (1207) can be in charge of ARQ, and the Slave RLC entity (1205) need not buffer PDUs that it has transmitted to the UE.

One problem in Master/Slave RLC scheme is that the RLC status PDU may not be transmitted by SeNB (1201) if the size of an RLC status PDU is larger than the available transmitting resource in SeNB (1201). Since the retransmission is managed by the MeNB (1203), the MeNB (1203) is responsible for generating the RLC status PDU. However, since the Xn interface is non-ideal backhaul, the size information from SeNB (1201) cannot be delivered to MeNB (1203) instantly, and therefore the MeNB (1203) generates the RLC status PDU without considering the size of transmitting resource in SeNB (1201).

If the SeNB (1201) receives from the MeNB (1203) an RLC status PDU whose size is larger than the transmitting resource, it cannot transmit the RLC status PDU until the transmitting resource whose size being larger than the RLC status PDU is available. It would cause stalling of status reporting, which leads to decreased throughput.

Figure 13A:
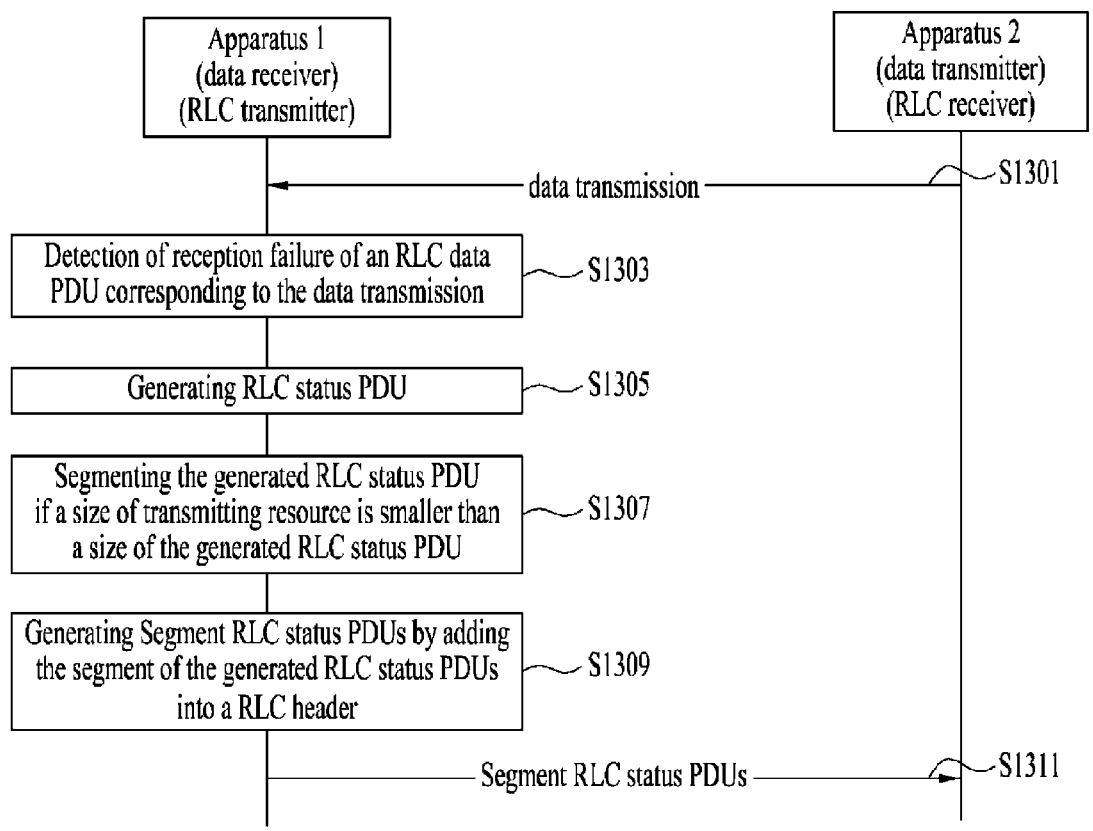

FIGS. 13A and 13B are conceptual diagrams for segmenting and re-ordering an RLC status PDU according to embodiments of the present invention.

To overcome the size problem of the RLC status PDU, it is invented that the RLC transmitter (or transmitting side of RLC entity) performs the segmentation of RLC status PDU, and the RLC receiver (or the receiving side of RLC entity) performs the reordering of segment RLC status PDUs. This invention can be applied a general RLC operation, as well as above mentioned scenario, Master/Slave RLC scheme.

The steps of S1301 to S1311 described in FIG. 13A are performed in a data receiver (hereafter, apparatus 1). And the steps of S1311 to S1323 described in FIG. 13B are performed in a data transmitter (hereafter, apparatus 2). It can suppose that the apparatus 2 transmit data to the apparatus 1, but it is no limited thereto. The apparatus 1 and the apparatus 2 have each AM RLC entity. And a transmitting side of RLC entity of the apparatus 1 (hereafter, RLC transmitter) and a receiving side of RLC entity of the apparatus 2 (hereafter, RLC receiver) are peer. The term 'data receiver' and 'RLC transmitter' are used in view that the apparatus 1 transmits the RLC status PDU to the apparatus 2 in response to that data reception. Thus, the apparatus 1 can be a data receiver and a RLC transmitter. And the term 'data transmitter' and 'RLC receiver' are used in view that the apparatus 2 receives the RLC status PDU from the apparatus 1 in response to the data transmission. Thus, the RLC transmitter performs the segmentation of RLC status PDU, and the RLC receiver performs the reordering of segment RLC status PDUs.

If the apparatus 1 is a user equipment, the RLC transmitter is an RLC entity of the user equipment and the RLC receiver is an RLC entity of a base station linked with the user equipment, and vice versa.

The apparatus 1 (=RLC transmitter) receives from data the apparatus 2 (=RLC receiver) (S1301). During the transmission, if the RLC transmitter detects reception failure of an RLC data PDU corresponding to the data transmission (S1303), the RLC transmitter generates a RLC status PDU regarding the reception failure of an RLC data PDU (S1305).

The RLC transmitter generates a RLC status PDU based on the retransmission buffer without considering "the total size of RLC PDU(s)" indicated by MAC (Medium Access Control) entity. The RLC status PDU may contain status information of the RLC data PDUs from RLC Data PDU with SN=VR(R) up to but not including RLC data PDU with SN=ACK_SN (i.e. VR(R) SN<ACK_SN), but it is not limited thereto.

For example, for the AMD PDUs with SN such that VR(R)≤SN≤ACK_SN that has not been completely received yet, in increasing SN order of PDUs and increasing byte segment order within PDUs, starting with SN=VR(R) up to the SN=ACK_SN. The 'SN' is a sequence number of the RLC status PDU, and the 'VR(R)' is a received state variable. This state variable holds the value of the SN following the last in-sequence completely received AMD PDU, and it serves as the lower edge of the receiving window. It is initially set to 0, and is updated whenever the AM RLC entity receives an AMD PDU with SN=VR(R). The 'ACK_SN' indicates the SN of the next not received RLC data PDU which is not reported as missing in the RLC status PDU.

When the RLC receiver receives the RLC status PDU, it interprets that all AMD PDUs up to but not including the AMD PDU with SN=ACK_SN have been received by its peer AM RLC entity, excluding those AMD PDUs indicated in the RLC status PDU with NACK_SN and portions of AMD PDUs indicated in the RLC status PDU with NACK_SN, SOstart and SOend.

If an AMD PDU for which no byte segments have been received yet, a NACK_SN which is set to the SN of the AMD PDU may be included in the RLC status PDU. And if a continuous sequence of byte segments of a partly received AMD PDU that have not been received yet, a set of NACK_SN, SOstart and SOend may be included in the RLC status PDU. And the RLC transmitter may set the ACK_SN to the SN of the next not received RLC data PDU which is not indicated as missing in the resulting RLC status PDU.

If a total transmission resource size of RLC status PDU indicated by lower layer is smaller than a size of the generated RLC status PDU of the step of S1305, the RLC transmitter can segment the generated RLC status PDU (S1307). The Segment RLC status PDUs should be fit into the total transmission resource size of RLC status PDU indicated by lower layer.

After the step of S1307, the RLC transmitter can generate a plurality of Segment RLC status PDUs by adding a segment of the generated RLC status PDU into a RLC header including segmentation information (S1309). For the Segment RLC status PDUs, a new RLC Control PDU format is invented.

Figure 14A:
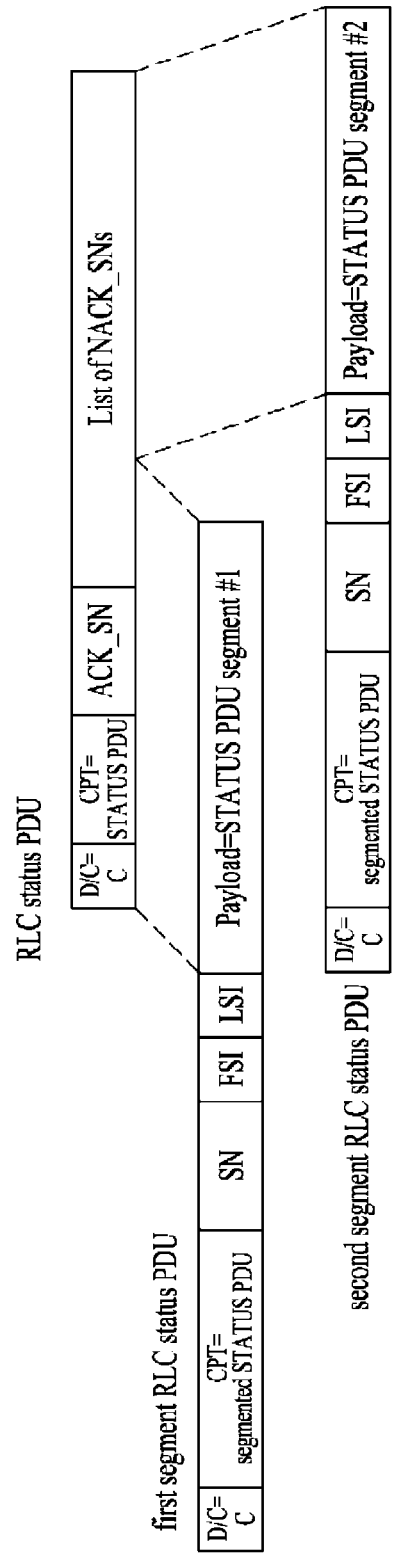
FIGS. 14A and 14B are examples of Segment RLC status PDUs format according to embodiments of the present invention.
Figure 14B:
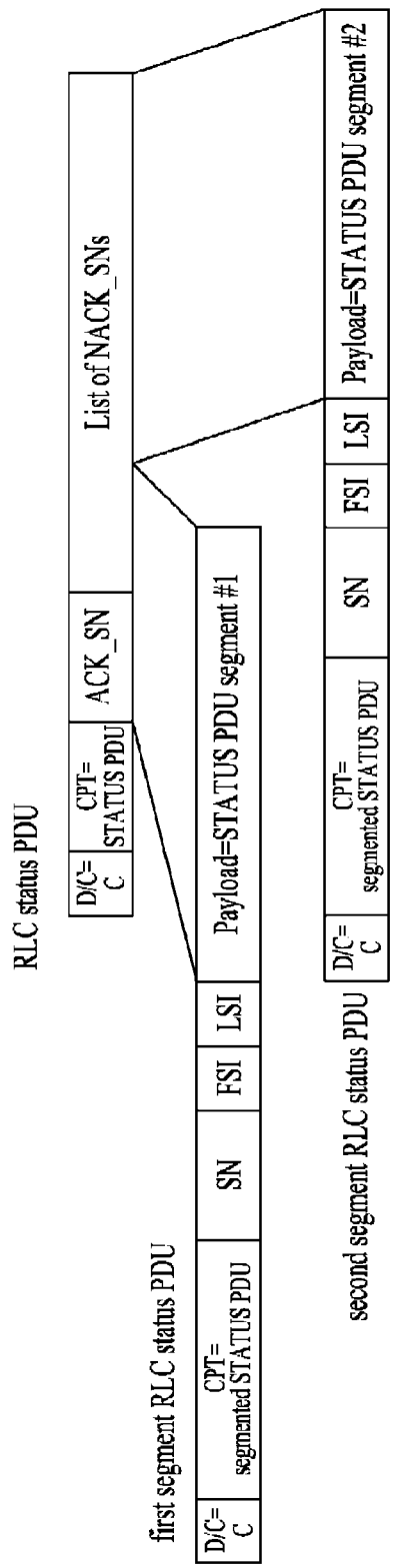

FIGS. 14A and 14B are examples of the Segment RLC status PDUs format according to embodiments of the present invention.

FIG. 14A is an example for segmenting a RLC status PDU including a header and FIG. 14B is an example for segmenting a portion of the RLC status PDU. In case of FIG. 14B, the portion of the RLC status PDU may be a payload part including only an 'ACK_SN field' of the RLC status PDU. In other word, a part of RLC status PDU excluding a 'D/C field' and a 'CPT field' can be segmented, but it is not limited thereto.

Regarding FIGS. 14A and 14B, each Segment RLC status PDU has a segment of the generated RLC status PDU and a RLC header including a 'D/C field' and segmentation information. The 'D/C field' indicates whether an RLC PDU is an RLC data PDU or an RLC status PDU. The segmentation information indicates a position order of the Segment RLC status PDU in the RLC status PDU.

The segmentation information included in the RLC header may comprises at least one of a 'CPT (Control PDU Type) field', a 'SN (Sequence Number) field', a 'FSI (First Segment Indicator) field' or an 'LSI (Last Segment Indicator) field'.

The 'CPT field' indicates whether a RLC status PDU is a Segment RLC status PDU or not. For example, if the 'CPT field' indicates '001', that may indicate that it is allocated to Segment RLC status PDU. The 'SN field' indicates a sequence number of a corresponding Segment RLC status PDU. This sequence number is independent from a sequence number of RLC data PDU. It is incremented by 1 for each Segment RLC status PDU.

And the 'FSI field' indicates whether a first byte of the RLC status PDU corresponds to a first byte of the Segment RLC status PDU. For example, if the 'FSI field' indicates '0', that the first byte of the Payload field corresponds to the first byte of a RLC status PDU, and if the 'FSI field' indicates '1', it can mean that the first byte of the Payload field does not correspond to the first byte of the RLC status PDU. The 'LSI field' indicates whether a last byte of the RLC status PDU corresponds to a last byte of the Segment RLC status PDU. For example, if the 'LSI field' indicates '0', that the last byte of the Payload field corresponds to the last byte of the RLC status PDU, and if the 'LSI field' indicates '1', it can mean that the last byte of the Payload field does not correspond to the last byte of a RLC status PDU, but it is not limited thereto.

Regarding FIG. 13B, the RLC transmitter transmits the Segment RLC status PDU after the step of S1309 (S1311). When the RLC receiver receives a RLC status PDU, the RLC receiver can check the D/C field. If the D/C field indicates RLC status PDU, the RLC receiver may check further the CPT field. If the CPT field indicates a Segment status PDU, the RLC receiver may store the RLC status PDU in the reordering buffer and may starts a timer when one of the plurality of Segment RLC status PDUs is received and there is no running timer (S1313). The timer can be used to detect the loss of Segment RLC status PDU. A Segment RLC status PDU can be lost during transmission, and the timer is used to limit the waiting time for the lost Segment RLC status PDU.

When the timer starts, the RLC receiver may perform reordering of Segment RLC status PDU based on the SN field, the FSI filed, and the LSI field (S1315). The RLC receiver may store the received Segment RLC status PDUs in increasing order of SNs until all segments of original RLC STATUS PDU is received.

The RLC receiver can decide that all Segment RLC status PDUs are received if a Segment RLC status PDU with lowest SN contains a FSI=0, a Segment RLC status PDU with the highest SN contains a LSI=0, and there are no missing PDUs between them, but it is not limited thereto.

When all Segment RLC status PDU are received, the RLC receiver can stop the timer (S1317) and reassemble an RLC status PDU from the re-ordered Segment RLC status PDUs (S1319), and can deliver it to RLC Control Unit to perform further actions such as transmission window update, retransmission, etc. (not described in FIG. 13b).

When the timer expires, if the RLC receiver detects one of missing Segment RLC status PDUs, the RLC receiver may discard all stored Segment RLC status PDUs (S1321), and may send a poll to the RLC transmitter to request transmission of an RLC status PDU (S1323).

Figure 15:
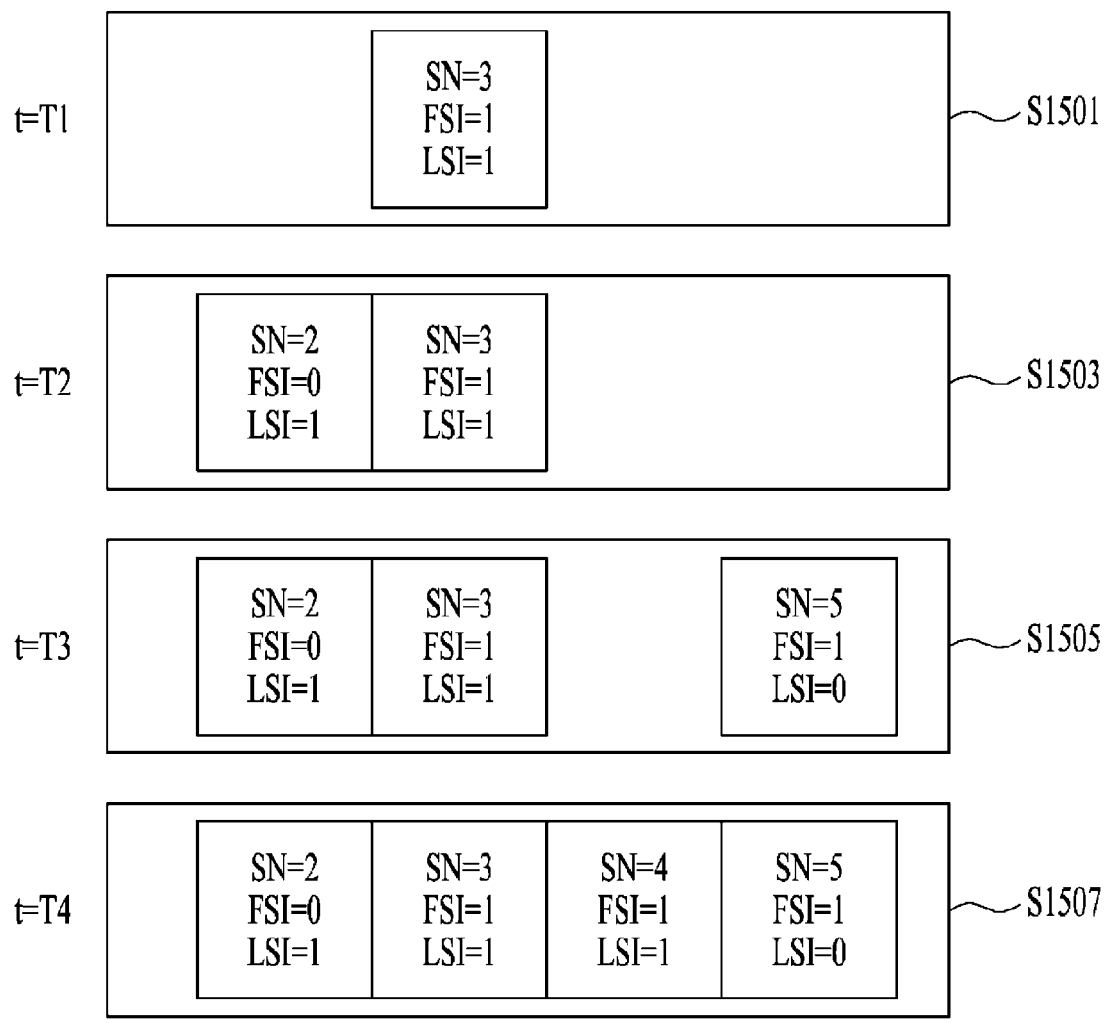
FIG. 15 is an example for reordering Segment RLC status PDUs based on a timer in an RLC receiver according to embodiments of the present invention.

FIG. 15 is an example for reordering the Segment RLC status PDUs based on a timer in a RLC receiver according to embodiments of the present invention.

Regarding FIG. 15, the RLC receiver can receive a Segment RLC status PDU at time=T1 and start a timer because there is no running timer (S1501). At time=T2, the RLC receiver may keep the timer running because a Segment RLC status PDU with LSI=0 has not been received (S1503). At time=T3, the RLC receiver may still keep the timer running because a Segment RLC status PDU with SN=4 has not been received (S1505). And finally, the RLC receiver may stop the timer because all Segment RLC status PDUs are received at time=4 (S1507).

Figure 16:
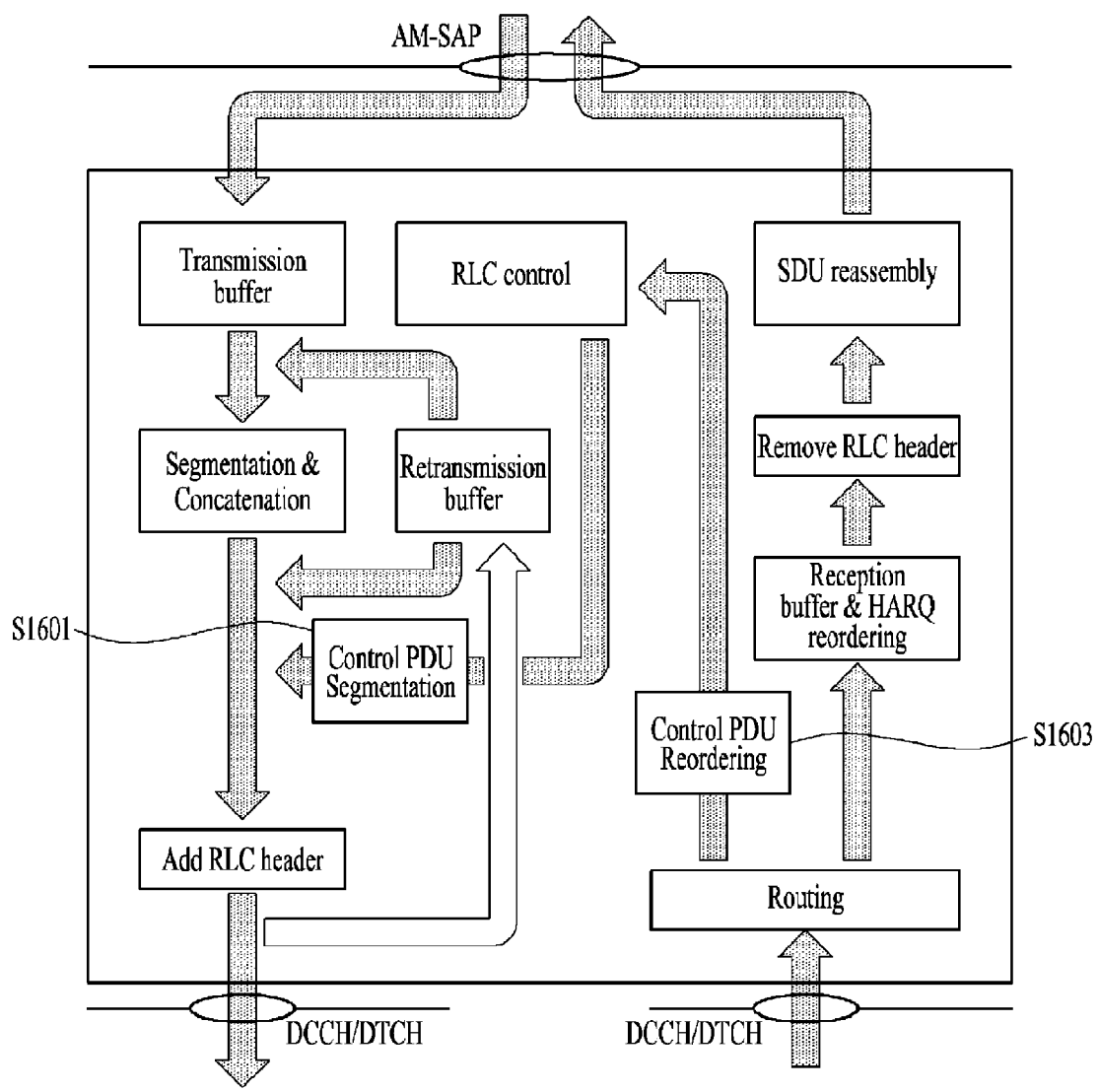
FIG. 16 is an example of an RLC structure applied to embodiments of the present invention.
Figure 17:
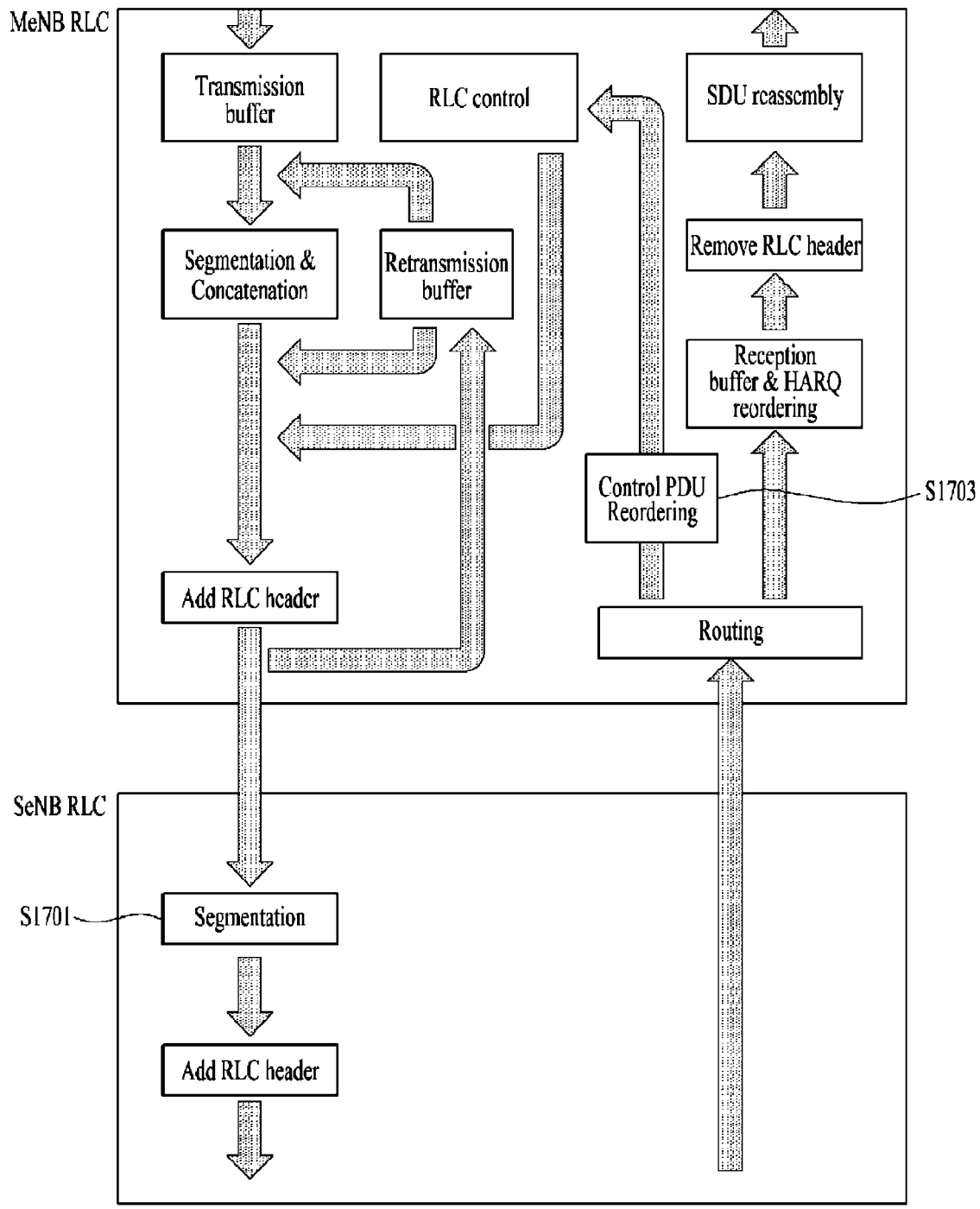
FIG. 17 is an example of an RLC structure applied to embodiments of the present invention in a dual connectivity system.

FIG. 16 is an example of an RLC structure applied to embodiments of the present invention, and FIG. 17 is an example of an RLC structure applied to embodiments of the present invention in a dual connectivity system.

FIG. 16 can show an example RLC model supporting segmentation and reordering of Segment RLC status PDUs. Compared with prior art, Segmentation block (1601) is added in the transmission path to support RLC status PDU segmentation, and Reordering block (S1603) is added in the reception path to support RLC status PDU reordering.

FIG. 16 can show an example RLC model supporting segmentation and reordering of Segment RLC status PDUs. Compared with prior art, Segmentation block (1601) is added in the transmission path to support RLC status PDU segmentation, and Reordering block (S1603) is added in the reception path to support RLC status PDU reordering.

For dual connectivity supported in LTE Rel-12 SCG enhancement, the RLC functions in the network side are distributed between MeNB and SeNB. Therefore, the RLC model in FIG. 16 cannot be applied in this case, and can instead the RLC model in FIG. 17 is applied, it is not limited thereto.

In FIG. 17, Segmentation block (1701) is implemented in SeNB RLC (Slave RLC) while all other functions including Reordering are implemented in MeNB RLC (Master RLC) (1703). Note that the Segmentation block (1701) in SeNB RLC performs segmentation for both Data and Control PDUs. The UE side RLC model is same as FIG. 16 if Control PDU segmentation is supported or MeNB RLC in FIG. 17 if Control PDU segmentation is not supported.

Figure 18:
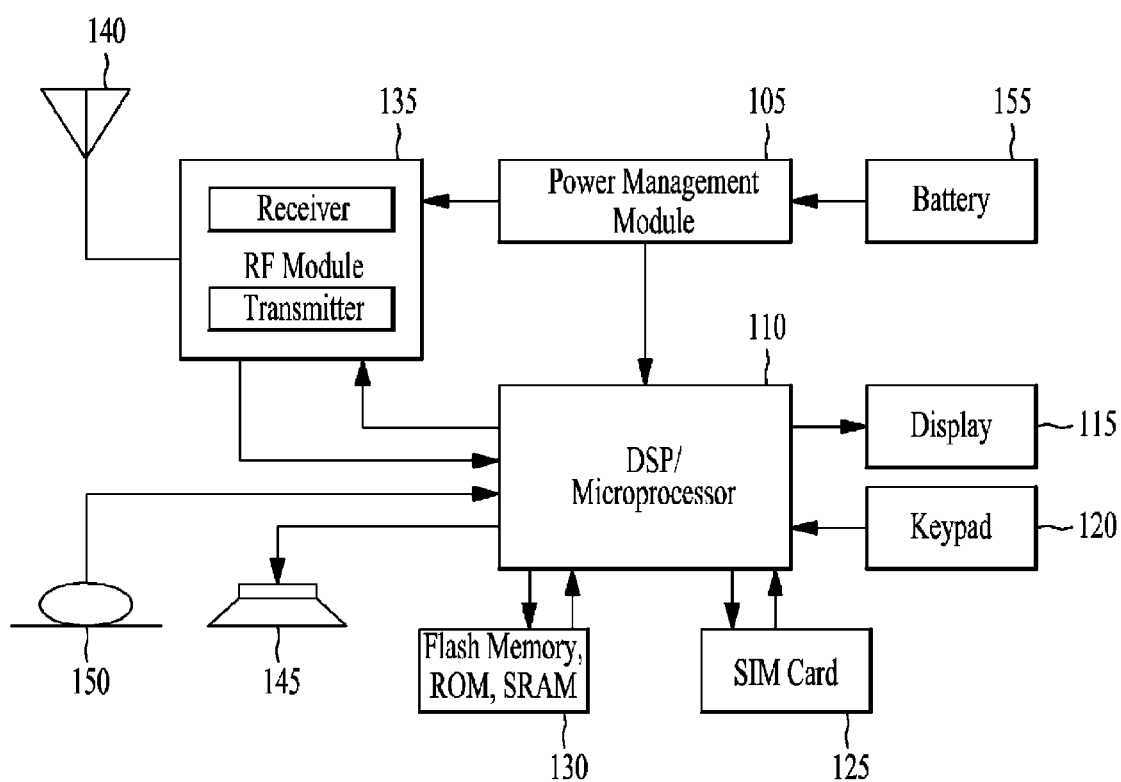
FIG. 18 is a block diagram of a communication apparatus according to an embodiment of the present invention.

FIG. 18 is a block diagram of a communication apparatus according to an embodiment of the present invention.

The apparatus shown in FIG. 18 can be a user equipment (UE) and/or eNB adapted to perform the above mechanism, but it can be any apparatus for performing the same operation.

As shown in FIG. 18, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 18 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 18 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for an user equipment (UE) transmitting Radio Link Control (RLC) data Protocol Data Units (PDUs) operating in a wireless communication system, the method comprising:
receiving, by the UE, a plurality of RLC status PDUs, wherein each of the plurality of Segment RLC status PDUs includes a segment of a RLC status PDU and a RLC header including segmentation information;
re-ordering, by the UE, the plurality of Segment RLC status PDUs based on the segmentation information; and
re-assembling, by the UE, an RLC status PDU from the re-ordered Segment RLC status PDUs,
wherein the receiving comprises:
starting, by the UE, a timer when one of the plurality of Segment RLC status PDUs is received and there is no running timer; and
stopping, by the UE, the timer if a First Segment Indicator (FSI) field of a Segment RLC status PDU with a lowest sequence number indicates '0' and a Last Segment Indicator (LSI) field of a Segment RLC status PDU with a highest sequence number indicates '0'.

2. The method according to claim 1, wherein the segmentation information indicates a position order of the Segment RLC status PDU in the generated RLC status PDU.

3. The method according to claim 1, wherein the segmentation information includes at least one of:
a 'CPT(Control PDU Type) field' indicating the RLC status PDU is segmented,
a 'SN (Sequence Number) field' indicating a sequence number of a corresponding Segment RLC status PDU among the plurality of Segment RLC status PDUs,
a 'FSI (First Segment Indicator) field' indicating a first byte of the RLC status PDU corresponds to a first byte of the corresponding Segment RLC status PDU, or
an 'LSI (Last Segment Indicator) field' indicating a last byte of the RLC status PDU corresponds to a last byte of the corresponding Segment RLC status PDU.

4. The method according to claim 1, the method further comprising:
discarding the received Segment RLC status PDUs if one or more Segment RLC status PDUs are not received until the timer expires; and
sending a poll to request transmission of an RLC status PDUs.

5. An apparatus configured to transmit Radio Link Control (RLC) data Protocol Data Units (PDUs) in a wireless communication system, the apparatus comprising:
an RF (radio frequency) module; and
a processor configured to control the RF module,
wherein the processor is configured to
receive a plurality of RLC status PDUs,
wherein each of the plurality of Segment RLC status PDUs includes a segment of a RLC status PDU and a RLC header including segmentation information;
re-order the plurality of Segment RLC status PDUs based on the segmentation information;
re-assemble an RLC status PDU from the re-ordered Segment RLC status PDUs,
start a timer when one of the plurality of Segment RLC status PDUs is received and there is no running timer, and
stop the timer if a First Segment Indicator (FSI) field of a Segment RLC status PDU with a lowest sequence number indicates '0' and a Last Segment Indicator (LSI) field of a Segment RLC status PDU with a highest sequence number indicates '0'.

6. The apparatus according to claim 5, wherein the segmentation information indicates a position order of the Segment RLC status PDU in the generated RLC status PDU.

7. The apparatus according to claim 5, wherein the segmentation information includes at least one of:
- a 'CPT(Control PDU Type) field' indicating the RLC status PDU is segmented,
- a 'SN (Sequence Number) field' indicating a sequence number of a corresponding Segment RLC status PDU among the plurality of Segment RLC status PDUs,
- a 'FSI (First Segment Indicator) field' indicating whether a first byte of the RLC status PDU corresponds to a first byte of the corresponding Segment RLC status PDU, or
- an 'LSI (Last Segment Indicator) field' indicating a last byte of the RLC status PDU corresponds to a last byte of the corresponding Segment RLC status PDU.

8. The apparatus according to claim 5, wherein the processor is further configured to discard the received Segment RLC status PDUs if one or more Segment RLC status PDUs are not received until the timer expires, and to send a poll to request transmission of a RLC status PDU.

* * * * *